US010764283B1

(12) United States Patent
Blinn

(10) Patent No.: US 10,764,283 B1
(45) Date of Patent: *Sep. 1, 2020

(54) MONITORING TO TRIGGER ON DEMAND MULTIFACTOR AUTHENTICATION

(71) Applicant: Go Daddy Operating Company, LLC, Scottsdale, AZ (US)

(72) Inventor: Arnold Neil Blinn, Hunts Point, WA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 292 days.

This patent is subject to a terminal disclaimer.

(21) Appl. No.: 15/610,461

(22) Filed: May 31, 2017

(51) Int. Cl.
*H04L 29/06* (2006.01)
*H04L 29/12* (2006.01)
*H04L 29/08* (2006.01)

(52) U.S. Cl.
CPC ...... *H04L 63/0876* (2013.01); *H04L 61/1511* (2013.01); *H04L 63/1425* (2013.01); *H04L 63/20* (2013.01); *H04L 67/02* (2013.01); *H04L 67/306* (2013.01)

(58) Field of Classification Search
CPC . H04L 63/0876; H04L 63/20; H04L 63/1425; H04L 67/02; H04L 61/1511; H04L 67/306
USPC ............................................................ 726/6
See application file for complete search history.

(56) References Cited

U.S. PATENT DOCUMENTS

| 7,373,515 | B2 | 5/2008 | Owen et al. |
| 8,650,405 | B1 | 2/2014 | Dotan et al. |
| 8,972,590 | B2* | 3/2015 | Haghpassand .......... G06F 21/50 709/229 |
| 9,479,533 | B2 | 10/2016 | Gupta et al. |
| 9,485,213 | B2 | 11/2016 | Schilling |
| 9,647,979 | B2 | 5/2017 | Gupta |
| 9,807,053 | B1 | 10/2017 | Schilling et al. |
| 9,954,818 | B2 | 4/2018 | Ptalis et al. |
| 10,341,322 | B1* | 7/2019 | Blinn .................. H04L 63/0853 |
| 10,341,323 | B1* | 7/2019 | Blinn ...................... H04L 63/20 |
| 10,594,484 | B2* | 3/2020 | Rodriguez ............ H04L 9/3234 |
| 2003/0145232 | A1* | 7/2003 | Poletto ............... H04L 63/1408 726/22 |
| 2006/0200855 | A1* | 9/2006 | Willis ................... H04L 9/3271 726/2 |

(Continued)

*Primary Examiner* — Aravind K Moorthy
(74) *Attorney, Agent, or Firm* — Greenberg Traurig, LLP

(57) ABSTRACT

A domain name registrar may suggest and/or allow a user to select one or more domain names registered to the user for on demand multifactor authentication. The user may select one or more protected activities that trigger the enhanced security for the selected domain name(s). The user may also enter a plurality of authenticatees, contact information for the authenticatees and a minimum number of authenticatees required to approve the one or more protected activities. The user and/or authenticatees may also enter at least two authentication methods for each authenticatee and corresponding correct responses. The selected domain names are thus protected from the protected activities until approved by a minimum number of authenticatees using at least a first authentication method and a second authentication method selected from different groups of "what you know," "what you have" and "what you are" authentication methods.

20 Claims, 12 Drawing Sheets

(56) References Cited

U.S. PATENT DOCUMENTS

| | | | |
|---|---|---|---|
| 2007/0261103 A1 | 11/2007 | Viavant et al. | |
| 2009/0013402 A1* | 1/2009 | Plesman | H04L 9/3226 |
| | | | 726/18 |
| 2010/0017413 A1* | 1/2010 | James | G06Q 20/02 |
| | | | 707/E17.032 |
| 2010/0325723 A1* | 12/2010 | Essawi | H04L 9/3234 |
| | | | 726/20 |
| 2012/0174198 A1 | 7/2012 | Gould et al. | |
| 2013/0279345 A1* | 10/2013 | Tamura | H04W 76/10 |
| | | | 370/241 |
| 2014/0068052 A1* | 3/2014 | Coleman | H04L 47/82 |
| | | | 709/224 |
| 2014/0258346 A1* | 9/2014 | Meltzer | G06F 16/16 |
| | | | 707/822 |
| 2015/0188945 A1* | 7/2015 | Kjeldaas | H04L 63/20 |
| | | | 726/1 |
| 2016/0099924 A1* | 4/2016 | Mehta | G06F 21/31 |
| | | | 726/7 |
| 2016/0182490 A1* | 6/2016 | Gupta | G06F 21/62 |
| | | | 713/171 |
| 2016/0343055 A1* | 11/2016 | Blinn | G06Q 30/0637 |
| 2017/0078321 A1* | 3/2017 | Maylor | H04L 63/1433 |
| 2017/0195310 A1* | 7/2017 | Tyler | H04L 63/083 |
| 2018/0006912 A1* | 1/2018 | Sokolik | H04L 43/062 |

* cited by examiner

Interface (Webpage or Application Screen) 200

Select One or More Doman Names for Enhanced Security

Domain Name(s) Registered to John Doe:

| Abc-company.com | [X] |
| Abc-co.com | [ ] |
| Abc-company.org | [X] |
| JohnDoe.com | [ ] |
| JohnHenryDoe.com | [ ] |

FIG. 2

Interface (Webpage or Application Screen) 200

Select One or More Protected Activities for Enhanced Security for the Selected Domain Name(s) of:

* Abc-company.com

* Abc-company.org

One or More Protected Activities Requiring Enhanced Security

| Removing Selected Domain Name(s) from Your Account | X |
| Changing a Domain Name System (DNS) Record | ☐ |
| Editing a Website Pointed to by the Selected Domain Name(s) | X |
| Changing Access to an Email Account Based on the Selected Domain Names | ☐ |

FIG. 3

Interface (Webpage or Application Screen) 200

Select or Enter One or More Authenticatees and Preferred Contact Methods

John Doe [X]

Contact Method email@johndoe.com [2]

(123) 456-7890 [1]

[_____] [ ]

Jane Smith [X]

Contact Method

Jane.Smith@MailServer.com [ ]

(012) 345-6789 [1]

[_____] [ ]

Contact Method

[Bob Jones] [X]

[(222) 333-4444] [1]

Minimum Number of Authenticatees to Approve Protected Activity? [2]

FIG. 4

Interface (Webpage or Application Screen) 200

John Doe

Select Authentication Methods for the Protected Activities of:

* Remove the selected domain name(s) from your account

* Edit a Website Pointed to by the Selected Domain Name(s)

For the Selected Domain Names of:

* Abc-company.com

* Abc-company.org

Select Authentication Methods

What You Know    [X]

Enter Password    [ 2Sr#eRlkqoc99 ]

What You Are    [X]

Select to enter Iris Scan

Select to enter Fingerprint

What You Have    [ ]

Enter Cell Phone Number    [          ]

Enter Code Generator Contact Information

Database(s) Supporting On Demand Multifactor Authentication 160

First User

First Domain Name

First Protected Activity

First Authenticatee
                First Authentication Method w/ Correct Response
                Second Authentication Method w/ Correct Response
                Contact Method Second Authenticatee
                First Authentication Method w/ Correct Response
                Second Authentication Method w/ Correct Response
                Contact Method Third Authenticatee
                First Authentication Method w/ Correct Response
                Second Authentication Method w/ Correct Response
                Contact Method First Minimum Number of Authenticatees Second Protected Activity First Authenticatee
                First Authentication Method w/ Correct Response
                Second Authentication Method w/ Correct Response
                Contact Method Second Authenticatee
                First Authentication Method w/ Correct Response
                Second Authentication Method w/ Correct Response
                Contact Method Third Authenticatee
                First Authentication Method w/ Correct Response
                Second Authentication Method w/ Correct Response
                Contact Method Second Minimum Number of Authenticatees

FIG. 6

Database(s) Supporting On Demand Multifactor Authentication 160

(First User)

Second Domain Name

First Protected Activity

First Authenticatee
                First Authentication Method w/ Correct Response
                Second Authentication Method w/ Correct Response
                Contact Method Second Authenticatee
                First Authentication Method w/ Correct Response
                Second Authentication Method w/ Correct Response
                Contact Method Third Authenticatee
                First Authentication Method w/ Correct Response
                Second Authentication Method w/ Correct Response
                Contact Method First Minimum Number of Authenticatees Second Protected Activity First Authenticatee
                First Authentication Method w/ Correct Response
                Second Authentication Method w/ Correct Response
                Contact Method Second Authenticatee
                First Authentication Method w/ Correct Response
                Second Authentication Method w/ Correct Response
                Contact Method Third Authenticatee
                First Authentication Method w/ Correct Response
                Second Authentication Method w/ Correct Response
                Contact Method Second Minimum Number of Authenticatees

FIG. 7

Database(s) Supporting On Demand Multifactor Authentication 160

Second User

First Domain Name

First Protected Activity

First Authenticatee
                First Authentication Method w/ Correct Response
                Second Authentication Method w/ Correct Response
                Contact Method Second Authenticatee
                First Authentication Method w/ Correct Response
                Second Authentication Method w/ Correct Response
                Contact Method Third Authenticatee
                First Authentication Method w/ Correct Response
                Second Authentication Method w/ Correct Response
                Contact Method First Minimum Number of Authenticatees Second Protected Activity First Authenticatee
                First Authentication Method w/ Correct Response
                Second Authentication Method w/ Correct Response
                Contact Method Second Authenticatee
                First Authentication Method w/ Correct Response
                Second Authentication Method w/ Correct Response
                Contact Method Third Authenticatee
                First Authentication Method w/ Correct Response
                Second Authentication Method w/ Correct Response
                Contact Method Second Minimum Number of Authenticatees

FIG. 8

Database(s) Supporting On Demand Multifactor Authentication 160

(Second User)

Second Domain Name

First Protected Activity

First Authenticatee
                First Authentication Method w/ Correct Response
                Second Authentication Method w/ Correct Response
                Contact Method Second Authenticatee
                First Authentication Method w/ Correct Response
                Second Authentication Method w/ Correct Response
                Contact Method Third Authenticatee
                First Authentication Method w/ Correct Response
                Second Authentication Method w/ Correct Response
                Contact Method First Minimum Number of Authenticatees Second Protected Activity First Authenticatee
                First Authentication Method w/ Correct Response
                Second Authentication Method w/ Correct Response
                Contact Method Second Authenticatee
                First Authentication Method w/ Correct Response
                Second Authentication Method w/ Correct Response
                Contact Method Third Authenticatee
                First Authentication Method w/ Correct Response
                Second Authentication Method w/ Correct Response
                Contact Method Second Minimum Number of Authenticatees

FIG. 9

MONITORING TO TRIGGER ON DEMAND MULTIFACTOR AUTHENTICATION

FIELD OF THE INVENTION

The present invention generally relates to methods of enhancing the security of Internet assets, such as domain names, websites and web services (such as email accounts), using on demand multifactor authentication.

SUMMARY OF THE INVENTION

In an example embodiment, a domain name registrar may receive from a client device operated by a user a selection of one or more domain names requiring a successful multifactor authentication prior to performing one or more protected activities. The domain name registrar may also automatically monitor one or more risk factors for the domain name and its associated website, comprising: 1) the value of the domain name, 2) the value of the website pointed to by the domain name, 3) the rate of Internet traffic for the domain name/website, 4) the type of use of the website, i.e., commercial or personal and/or 5) the risk of loss as determined by a quantity and/or an access of the website to financial records, health records and/or customer personal information. One or more of these risk factors may be used to recommend to the user that enhanced security should be used and an appropriate level of enhanced security for the user's domain name.

The one or more protected activities may be any desired activities that may be performed on an Internet asset. As non-limiting examples, the protected activities may be: 1) removing the one or more domain names from a current user account, 2) transferring the domain name to a different domain name registrar, 3) changing a domain name system (DNS) record for the one or more domain names, 4) editing the website pointed to by the one or more domain names and/or 5) changing access to an email account based on the first domain name. The one or more protected activities may be selected by the user or the domain name registrar may select or recommend one or more protected activities based on the one or more risk factors. More risk factors would indicate that more activities should be protected.

The domain name registrar may receive from the client device operated by the user, i.e., the owner of the asset, a selection of one or more authenticatees and contact information. Alternatively, or in addition, the domain name registrar may automatically determine one or more authenticatees and contact information by: 1) parsing the website to determine VPs, President, Officers, and/or board of directors of the legal entity associated with the website, 2) parsing the website to determine its associated legal entity and then parsing corporate filings and/or public records of the legal entity to determine VPs, President, Officers, and/or board of directors and/or 3) parsing the WHOIS database for one or more listed contacts. The user is preferably given the option to select and/or approve the authenticatees automatically discovered by the domain name registrar. The plurality of authenticatees are the people who have the authority to approve the one or more protected activities on the one or more domain names.

The domain name registrar may receive from the user via a client device a minimum number of authenticatees in the plurality of authenticatees that must be authenticated for a successful multifactor authentication. In some embodiments, the minimum number of authenticatees that must be authenticated for the successful multifactor authentication is less than the total number of authenticatees in the plurality of authenticatees. This allows protected activities to be performed on the one or more domain names even if one or more of the authenticatees are unable to perform an authentication, possibly due to unavailability, vacation or sickness. In other embodiments, the domain name registrar may determine or recommend a minimum number of authenticatees that must be authenticated for a successful multifactor authentication based on the previously determined risk factors for the domain name and/or associated website. In some embodiments, one or more authenticatees may be a factor owned by an individual. As non-limiting examples, a factor may be an email account or a text message service, such as a Short Message Service (SMS).

The domain name registrar may receive for each selected authenticatee two or more authentication methods. The authentication methods and correct responses may be entered by either the user or each authenticatee may enter their own authentication methods and correct responses. The two authentication methods for each selected authenticatee are preferably from different groups, where the groups are 1) what you know based authentication, 2) what you are based authentication and 3) what you have based authentication. If the authenticatees have been used in the past for the same or for different domain names, the domain name registrar may use the authenticatees' identity, the authenticatees' contact information, the authenticatees' authentication methods and/or the authenticatees' correct responses as suggestions to either the user or corresponding authenticatee to simplify the entry of this data by the user or by the authenticatees.

The domain name registrar may receive a contact method for each selected authenticatee in the plurality of authenticatees. The information collected from the user and/or the authenticatees may be stored in a database and the user and/or authenticatees may be notified using their corresponding contact methods, such as by text messages and/or email messages, when the one or more protected domain names and the one or more protected activities have enhanced security.

The domain name registrar may monitor requested activities looking for a protected activity being requested on a domain name with enhanced security, thereby providing enhanced security for the domain names in regard to the protected activities.

The domain name registrar may receive a command from a user for a protected activity on the domain name. The domain name registrar may read from the database the plurality of authenticatees, the contact method(s) for each authenticatee, the minimum number of authenticatees that must be authenticated for a successful multifactor authentication, two correct responses and two authentication methods for each authenticatee in the plurality of authenticatees. As previously mentioned, the two authentication methods preferably correspond to two different members selected from the group consisting of what you know based authentication, what you are based authentication and what you have based authentication.

The domain name registrar may transmit a request for each of the two different authentication methods to each authenticatee in the pluralities of authenticatees using the corresponding contact method for the authenticatee.

If the minimum number of authenticatees are not authenticated by receiving two correct responses from the authenticatee in an allowed time period, the protected activity is not performed on the domain name. On the other hand, upon receiving two correct responses, from different groups of authentication methods, within the allowed time period from at least the minimum number of authenticatees that must be authenticated for the successful multifactor authentication, the domain name registrar performs the protected activity on the domain name.

In another embodiment, the domain name registrar may receive a command from a user for a protected activity on the domain name. The domain name registrar may read from the database one or more authenticatees, the contact method(s) for each authenticatee, the minimum number of authenticatees that must be authenticated for a successful multifactor authentication, one, two or more correct responses and one, two or more authentication methods for each authenticatee in the plurality of authenticatees.

The domain name registrar may transmit a request for one or more authentication methods to the one or more authenticatees using the corresponding contact method for each authenticatee.

If the minimum number of authenticatees are not authenticated by receiving one, two or more correct responses from the authenticatee in an allowed time period, the protected activity is not performed on the domain name. On the other hand, upon receiving one, two or more correct responses within the allowed time period from at least the minimum number of authenticatees that must be authenticated for the successful multifactor authentication, the domain name registrar performs the protected activity on the domain name.

In some embodiments, the domain name registrar may receive a request for the user for enhanced security or the domain name registrar may determine that one or more domain names have a value and/or an Internet traffic above a predetermined threshold. The domain name registrar may recommend to the user that the domain name(s) having the high value and/or Internet traffic should receive enhanced protection, possibly through the use of multifactor authentication as described in any of the above embodiments. Upon receiving a request from the user, the domain name registrar may use any of the above described methods for enhancing the security of the domain name or a website pointed to by the domain name. In another embodiment, the value and/or Internet traffic of the domain name may be checked periodically, and as the value and/or traffic to the website increases (possibly exceeding a predetermined threshold), the domain name registrar may suggest additional protection appropriate for the increased value and/or website traffic of the domain name to the user.

The above features and advantages of the present invention will be better understood from the following detailed description taken in conjunction with the accompanying drawings.

BRIEF DESCRIPTION OF THE DRAWINGS

FIG. 2 is an illustration of a whole or a partial screenshot of an interface that may be displayed on a client device and viewed by a user. The interface may be, as non-limiting examples, either a webpage or an application screen. The interface may display a list of domain names registered to the user and be configured to allow the user, via the client device, to select one or more registered domain names for enhanced security. The interface may also be configured to allow the domain name registrar to receive, via the client device, the one or more domain names selected by the user.

FIG. 3 is an illustration of a whole or a partial screenshot of an interface that may be displayed on a client device and viewed by a user. The interface may be, as non-limiting examples, either a webpage or an application screen. The interface may display a list of protected activities, i.e., activities that if requested trigger enhanced security prior to processing, to the user and be configured to allow the user, via the client device, to select one or more protected activities for the previously selected domain names for enhanced security.

FIG. 4 is an illustration of a whole or a partial screenshot of an interface that may be displayed on a client device and viewed by a user. The interface may be, as non-limiting examples, either a webpage or an application screen. The interface may display a list of authenticatees to the user and be configured to allow the user, via the client device, to select, remove, edit and/or add one or more authenticatees. The interface may also allow the user to enter one or more authenticatees. The interface may also allow the user to enter a minimum number of authenticatees that must be authenticated by two different methods to approve the protected activity before the protected activity may be performed.

FIG. 5 is an illustration of a whole or a partial screenshot of an interface that may be displayed on a client device and viewed by a user or displayed on a different client device and viewed by an authenticatee. The interface may be, as non-limiting examples, either a webpage or an application screen. The interface may display a list of authentication methods and be configured to allow the user or the authenticatee, via a client device, to select two or more authentication methods selected from different groups, and enter correct responses, of 1) what you know, 2) what you are and 3) what you have. The Interface also allows the user to enter a correct response (possibly by following a link), e.g., a password, biometric data and/or a cell phone number, for each authentication method.

FIGS. 6-9 are illustrations of a possible storage format used by a domain name registrar in storing data that may have been collected by the interface illustrated in FIGS. 2-5.

DETAILED DESCRIPTION

Figure 1:
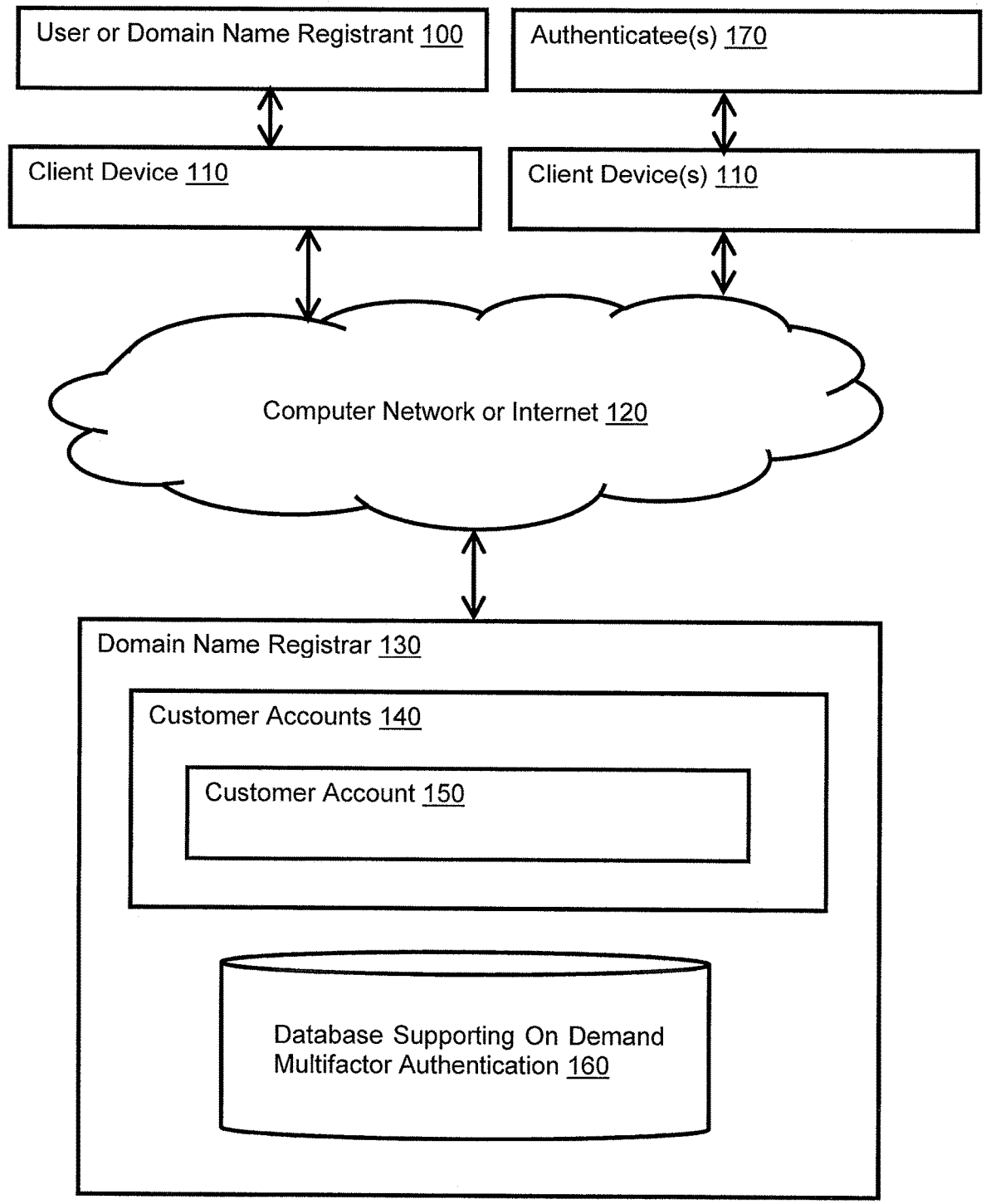
FIG. 1 is a block diagram of a system for protecting domain names and websites. The system comprises a computer network, such as the Internet, a domain name registrar running on one or more hardware servers and having customer accounts and one or more users and authenticatees in electronic communication with the domain name registrar via client devices and the computer network.

The present inventions will now be discussed in detail with regard to the attached drawing figures that were briefly described above. In the following description, numerous specific details are set forth illustrating Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

FIG. 1 is a block diagram of a system for protecting Internet 120 assets, such as domain names, websites and/or web services. The system comprises a computer network 120, such as the Internet, a domain name registrar 130 having customer accounts 140 and a user 100 and one or more authenticatee(s) 170 in electronic communication with the domain name registrar 130 via client devices 110 and the computer network 120. The arrows between the domain name registrar 130, computer network (such as the Internet) 120 and client device(s) 110 represent one or more communication paths and/or computer networks. Communications and transmissions over the arrows may use any currently known or developed in the future methods or protocols of electronic communications.

A computer network 120 is a collection of links and nodes (e.g., multiple computers and/or other devices connected together) arranged so that information may be passed from one part of the computer network to another over multiple links and through various nodes. Non-limiting examples of computer networks 120 include the Internet, public switched telephone networks, global Telex networks, intranet(s), extranet(s), local-area network(s), wide-area network(s), wired networks, wireless networks and cell phone networks.

The Internet 120 is a worldwide network of computers and computer networks arranged to allow for the easy and robust exchange of information between a computer user 100 via a client device 110 and one or more websites hosted on hardware servers. Hundreds of millions of users (people) around the world have access to client devices 110 connected to the Internet 120 via an Internet Service Provider (ISP). Content providers place multimedia information (e.g., text, graphics, audio, video, animation, and/or other forms of data) at specific locations on the Internet 120 referred to as websites. The combination of all the websites and their corresponding web pages on the Internet 120 is generally known as the World Wide Web (WWW) or simply the Web.

Websites may consist of a single webpage, but typically consist of multiple interconnected and related webpages. The webpages may be considered interfaces 200 that display information to the user 100 and also allow the user 100 to enter information. Websites may reside on one or more hardware servers and are typically prepared and maintained by a single individual or entity. Menus, links, tabs, etc. may be used to move between different webpages within the website or to move to a different webpage on an entirely different website.

Websites may be created using software or code to program the website to appear and operate as desired by the user 100. As a non-limiting example, HyperText Markup Language (HTML) may be used to generate a standard set of tags that define how the webpages for the website are to be displayed. A user 100 of the Internet 120 may access websites using software known as an Internet browser, such as MICROSOFT INTERNET EXPLORER®, GOOGLE CHROME® or MOZILLA FIREFOX®. After the browser has located the desired webpage, the browser requests and receives information concerning the webpage, i.e., software or computer code, typically in the form of an HTML document, and then the browser displays the webpage content for the user 100 on the client device 110 operated by the user 100. The user 100 then may see the displayed information, e.g., text, pictures and/or graphics, hear any transmitted sounds, enter information into fields on the webpage configured for this purpose, view other webpages at the same website and/or move to an entirely different website using the browser.

The user 100 may use a client device 110, such as, as non-limiting examples, a cell phone, PDA, tablet, laptop computer or desktop computer to access an interface 200 on an application or a website running on one or more servers via a computer network. The client device 110 may have a unique telephone number from which the user 100 can verify that the user 100 has control over the client device 110. The client device 100 may also be able to measure/record, store and transmit biometric measurements, such as one or more fingerprints of the user 100, the voice of the user, possibly saying a particular phrase and/or measuring an iris scan of the user 100. In other embodiments, a biometric recording device may be attached to the client device 110 (at which time the biometric recording device and the client device 110 may both be considered the client device 110) to enable the client device 110 to perform one or more biometric measurements and/or recordings.

Each website on the Internet may have a plurality of webpages and be hosted or operated from one or more hardware servers. The application may also be running or operated from one or more hardware servers of any desired make or model. The hardware servers for the websites and the applications may be, as a non-limiting example, one or more Dell PowerEdge(s) rack server(s), HP Blade Servers, IBM Rack or Tower servers, although other types of hardware servers and/or combinations of one or more hardware servers may also be used. The domain name registrar 130 is hereby defined to comprise at least one or more hardware servers and may also comprise software to automate the various processes described as part of this invention.

Browsers are able to locate specific websites because each website, resource, and computer on the Internet 120 has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The newer IP address standard, often called IP Version 6 (IPv6), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313). These notations are used to improve human readability.

IP addresses, however, even in human readable notation, are difficult for people to remember and use. A Uniform Resource Locator (URL) is much easier to remember and may be used to point to any computer, directory, or file on the Internet 120. A browser is able to access a website on the Internet 120 through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" portion identifies the URL as a HTTP request and the "companyname.com" portion is the domain name.

Domain names are much easier to remember and use than their corresponding IP addresses. The Internet Corporation for Assigned Names and Numbers (ICANN) and the Internet Assigned Numbers Authority (IANA) create rules and coordinate the use of over 1,000 Top-Level Domains (TLDs). Each TLD is typically assigned a single registry to be an authoritative source of information (the particular data stored by the registry may vary depending on the TLD). One or more domain name registrars may register domain names to domain name registrants (users 100, customers and/or domain name registrants) on behalf of a registry controlling the TLD of the registered domain names.

The process for registering a domain name with .com, .net, .org, and some other TLDs allows an Internet user 100 to use an ICANN-accredited domain name registrar 130 to register a domain name. For example, if a potential domain name registrant, John Doe, wishes to register the domain name "Abc-company.com," John Doe may initially determine whether the desired domain name is available by contacting a domain name registrar 130. As a non-limiting example, the potential domain name registrant (user 100 or customer) may make this contact using the registrar's webpage and typing the desired domain name into a field on the registrar's website created for this purpose. If the domain name is available, the registrar 130 may register via the domain name registry the domain name to the user 100 (officially the domain name registrant at this point). In this manner, the user 100 may register any number of different domain names and may point each registered domain name through the domain name system (DNS) to any desired website.

Domain names may point, i.e., direct Internet traffic, to a website through the use of the DNS. The DNS comprises one or more nameservers that are able to receive a domain name from a browser and then return an IP address for the domain name to the browser. In this manner, the browser may find the IP address for any website through the use of the DNS.

Figure 10:
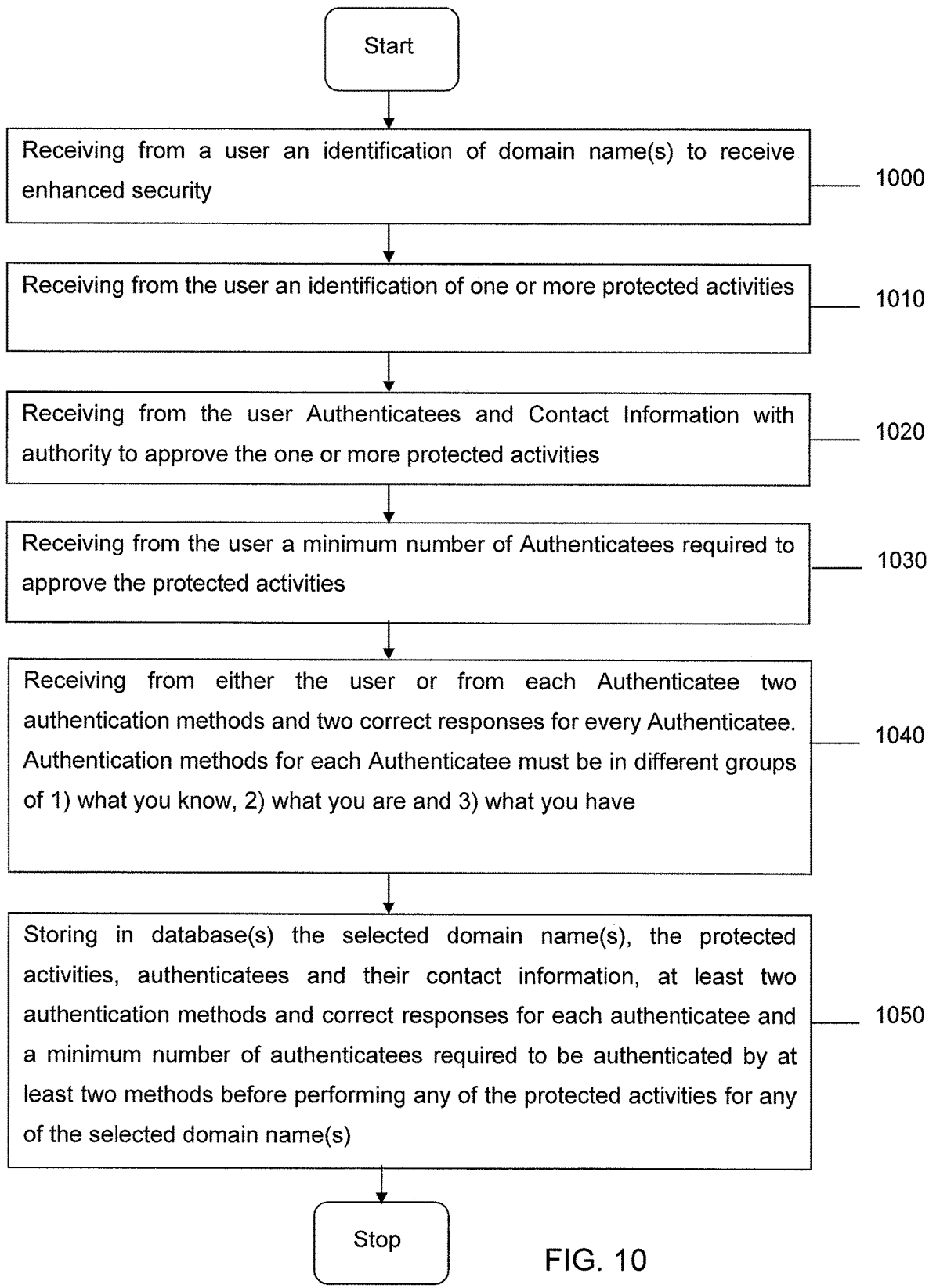
FIG. 10 is a flowchart illustrating a possible embodiment of a method for setting up enhanced security for one or more selected domain names.

Referring to FIG. 10, a method will be described for allowing a user 100 to set up and enable enhanced security for one or more Internet assets, such as domain names, websites and/or web services (such as an email account). The method allows for protecting the Internet assets from unauthorized protected activities without first receiving approval from a minimum number of authenticated authenticatee(s) 170. In some embodiments, the user may only select a single authenticatee 170 to be authenticated using one or more authentication methods. In these embodiments, the protected activity will be performed after the single authenticatee 170 has been authenticated. In other embodiments offering increased security, two or more authenticatee(s) 170 are authenticated using at least two methods, each method being from a different group of 1) what you know, 2) what you are and 3) what you have.

FIG. 2 is an illustration of a whole or a partial screenshot of an interface 200 that may be displayed on a client device 110 and viewed by a user 100. The interface 200 may be, as non-limiting examples, either a webpage or an application screen as illustrated in FIGS. 2-5. The domain name registrar 130 may review the customer account 150 of the user 100 to determine which domain names (or other Internet assets, such as websites and web services) are registered to the user 100.

The interface 200 may then display a list of the domain names registered to the user 100. The interface 200 may also be configured to allow the user 100, via the client device 110, to select one or more of the registered domain names (or other Internet assets) for enhanced security. As a specific example, FIG. 2 illustrates an interface 200 that displays the domain names of "Abc-company.com," "Abc-co.com," "Abc-company.org," "JohnDoe.com" and "JohnHenry Doe.com" that have been determined to be registered to the user 100. The user 100 may select one or more of the displayed domain names using any desired technique. (Step 1000)

In the embodiment illustrated in FIG. 2, a box next to each domain name may be selected so that the user 100 may indicate which domain names registered to the user 100 are to receive enhanced security. In other embodiments, the user 100 may click on or directly select any desired one or more domain names. As an example, in FIG. 2 the domain names of "Abc-company.com" and "Abc-company.org" have been selected to receive enhanced security. The user is preferably given options to define the type and level of enhanced security the asset(s) receive.

FIG. 3 is an illustration of a whole or a partial screenshot of an interface 200 that may be displayed on the client device 110 and viewed by the user 100. The interface 200 may display a list of protected activities to the user 100 and be configured to allow the user 100, via the client device 110, to select one or more protected activities for the previously selected domain names (or other Internet assets) for enhanced security. (Step 1010)

The protected activities may be any desired activity performed on any asset accessible online. As non-limiting examples, the protected activities could by changing settings on a music subscription, online news clippings, reading or changing billing, payment and/or banking information, etc. As another non-limiting example, the protected activities may be any desired activity performed by the domain name registrar 130 on the domain names. As non-limiting examples, the protected activities may be removing a domain name from a current account 150, changing a domain name system (DNS) record for the domain name, editing a website pointed to by the domain name and/or changing access to an email account based on the domain name. In the embodiment illustrated in FIG. 3, the protected activities of 1) removing selected domain name(s) from your account 150 and 2) editing a website pointed to by the selected domain name(s) are selected.

FIG. 4 is an illustration of a whole or a partial screenshot of an interface 200 that may be displayed on a client device 110 and viewed by a user 100. The interface 200 may display a list of authenticatees 170 to the user 100 and be configured to allow the user 100, via the client device 110, to select one or more authenticatees 170. In FIG. 4, the authenticatees 170 of John Doe and Jane Smith have been selected.

The interface 200 as illustrated in FIG. 4 may also allow the user 100 to enter one or more authenticatees 170. As an example, FIG. 4 illustrates that the authenticatee 170 of Bob Jones has been entered by the user 100. If desired, the authenticatee 170 of Bob Jones and Bob Jones' contact information may be saved in a database 160 so that future requests for enhanced security by the user 100 may automatically list Bob Jones and Bob Jones' contact information without this information having to be reentered by the user 100. While not specifically illustrated in FIG. 4, the interface 200 may also be configured to allow the user 100 to delete or edit information regarding one or more of the authenticatee(s) 170.

The interface 200 as illustrated in FIG. 4 may also be used to select one or more contact methods (as illustrated for authenticatees 170 John Doe and Jane Smith) and/or enter one or more contact methods (as illustrated for authenticatee 170 Bob Jones). In some embodiments, the user 100 may select an order or preference of contact methods for one or more of the authenticatees 170. As an example, FIG. 4 illustrates a preference of "1" for the contact method of the telephone number of (123) 456-7890 and a preference of "2" for the email address of email@johndoe.com for the authenticatee 170 of John Doe. Thus, in verifying the identity of "John Doe," the domain name registrar 130 may first try to use the contact method of the telephone number and then the contact method of the email address in contacting the authenticatee 170 of "John Doe." (Step 1020)

The interface 200 may also allow the user 100 to enter a minimum number of authenticatees 170 that must be authenticated by one, two or more selected methods to approve the protected activity before the protected activity may be performed. The minimum number may be entered by any desired means. As an example, FIG. 4 has an entry field configured for this purpose. In this example, the user 100 has entered "2" as the minimum number of authenticatees 170 needed to be authenticated before performing any of the one or more protected activities. (Step 1030)

In some embodiments, the interface 200 may also be configured to allow the user 100 to select a time period in which the minimum number of authenticatees 170 must be authenticated in order to perform the one or more protected activities. If the minimum number of authenticatee(s) is not authenticated within the selected time period, the requested protected activity is not performed on the domain name. The selected time period may be measured from any desired starting time to any desired ending time. As a non-limiting example, the starting time may start upon receiving the first authentication and stops upon receiving the last authentication necessary to perform the protected activity.

The minimum number of authenticatees 170 may be either the total number of authenticatees 170 or a number less than the total number of authenticatees 170. Using less than the total number of authenticatees 170 has the advantage of allowing protected activities to be performed even when one or more (the difference between the total number of authenticatees 170 and the minimum number required to perform protected activities) of the authenticatees 170 are not authenticated, possibly because one or more of the authenticatees 170 are on vacation, sick or otherwise unavailable.

FIG. 5 is an illustration of a whole or a partial screenshot of an interface 200 that may be displayed on a client device 110 and viewed by a user 100 or displayed on a different client device 110 and viewed by an authenticatee 170. The interface 200 may display a list of authentication methods and be configured to allow the user 100 or each of the authenticatees 170, via a client device 110, to select two or more authentication methods selected from different groups of 1) what you know, 2) what you are and 3) what you have.

The interface 200 as illustrated in FIG. 5 may be used for or by each authenticatee 170 selected by the user 100. Thus, each authenticatee 170 may select the same or a different combination of groups of authentication methods. Even when authenticatees 170 select the same group, the authenticatees 170 may select a different authentication method within the group. As an example, if the group "what you are" is selected by a first authenticatee 170 and a second authenticatee 170, the first authenticatee 170 may select an iris scan while the second authenticatee 170 may select to use a fingerprint method of authentication within the group of "what you are." This flexibility has the advantage of allowing each authenticatee 170 to have a personalized method of authentication while retaining the security of the protected Internet assets.

Authentication methods from the group of "what you know" are defined to be methods that require information from the authenticatee 170 that is known by the authenticatee 170, but preferably by as few other people as possible and most preferably zero other people (not counting the domain name registrar 130). Non-limiting examples from the group of "what you know" are a password (selected by either the domain name registrar 130, user 100 or authenticatee 170), a personal identification number (PIN) assigned by the domain name registrar 130 or a code which may be a random string of characters. As an example, the code may be generated by the domain name register and provided to the authenticatee 170. The code may comprise, as an example, 40 random characters that the authenticatee 170 may store in a safety deposit box.

Authentication methods from the group of "what you are" are defined to be methods that require biometric measurements of the authenticatee 170 and the selected biometric measurements are very unlikely to belong to any other person. Non-limiting examples from the group of "what you are" are fingerprints, handwriting samples, voice samples, DNA and/or iris scans. The authenticatee 170 may submit fingerprints, handwriting samples, voice samples, DNA and/or iris scans as the "correct responses" during setup and then resubmit fingerprints, handwriting samples, voice samples, DNA and/or iris scans during authentication of the authenticatee 170.

Authentication methods from the group of "what you have" are defined to be methods that require the authenticatee 170 to prove that the authenticatee 170 is in possession of some physical item. Non-limiting examples from the group of "what you have" are confirmation that the authenticatee 170 is in possession of a cell phone (possibly by responding to a text message or phone call), a smart card (possibly by inserting the smart card into a smart card reader that transmits a message to the domain name registrar 130) or a token. The token may be synchronized with an authentication server and display a string of characters that the authenticatee 170 may enter into an interface 200 on a website, application or on a cell phone. If the entered string of characters matches a string of characters produced by the authentication server, the authenticatee 170 may be authenticated as being in possession of the token.

Thus, the user 100 or each authenticatee 170 may select an authentication method of "what you know," which could be a password and "what you are," which could be a fingerprint scan. In preferred embodiments, the user 100 would not be able to select two authentication methods in the group of "what you know," two authentication methods in the group "what you are" or two authentication methods in the group "what you have" without also including one or more authentication methods from other groups.

Depending on the authentication methods chosen, the user 100 or authenticatee 170 may need to enter a correct response for one or more of the chosen authentication method. Thus, if the user 100 or authenticatee 170 selected an authentication method of "what you have," the user 100 or authenticatee 170 may enter a cell phone number of a cell phone in the procession of the authenticatee 170. For an authentication method of "what you know," the user 100 or authenticatee 170 may enter a password into a field in the interface 200 configured for the purpose of receiving the password. For an authentication method of "what you are," the authenticatee 170 may use the client device 110, possibly with an attachment specifically created for this purpose, to take a biometric reading of the user 100 and transmit the biometric reading to the domain name registrar 130. (Step 1040)

Once the user 100 and/or authenticatees 170 have 1) selected one or more domain names for enhanced security, 2) selected one or more protected activities, 3) selected one or more authenticatees 170 with contact information, 4) selected a minimum number of authenticatees 170 to approve the one or more protected activities, 5) selected two or more authentication methods for each authenticatee 170 and 6) entered correct responses or information for each authentication method for each authenticatee 170, the domain name registrar 130 may start to provide the enhanced protection of the domain name and/or other Internet assets.

Specifically, the domain name registrar 130 may prevent the one or more selected protected activities from being performed on the selected one or more domain names, until the domain name registrar 130 receives two correct responses from at least the minimum number of authenticatees 170 that must be authenticated for the successful multifactor authentication. In some embodiments, at least two authenticatees 170 in the plurality of authenticatees 170 have different authentication methods that must be authenticated for a successful multifactor authentication.

FIGS. 6-9 illustrate a possible storage format that may be used by a domain name registrar 130 in storing data that has been collected by the interface 200 illustrated in FIGS. 2-5. Specifically, the database(s) 160 supporting on demand multifactor authentication may store the user 100 name, one or more selected domain names registered to the user 100, one or more selected protected activities for each selected domain name, one or more authenticatees 170 for every selected protected activity, two or more authentication methods and corresponding correct responses for each authenticatee 170 and contact information for each authenticatee 170. (Step 1050)

It should be appreciated that this method allows different domain names, that are also registered to the user 100, to be selected that may have 1) different protected activities, 2) different authenticatees 170, 3) different minimum number of authenticatees 170 to approve protected activities, 4) different authentication methods and/or 5) any combination thereof. Thus, a user 100 having a high value domain name may, as an example, require more authenticatees 170 to approve one or more protected activities, while the user 100 having a low value domain name, as an example, may require fewer, simpler or no authentication methods.

It should also be appreciated that even for the same domain name, different protected activities may be selected that have 1) different authenticatees 170, 2) a different minimum number of authenticatees 170 to approve the different protected activities, 3) different authentication methods and/or 4) any combination thereof. Thus, if the user 100 is concerned about a domain name being transferred out of the account 150 of the user 100, but is less concerned about a website pointed at by the domain name being edited, the user 100 may require more authenticatees 170 to approve moving the domain name out of the user account 150, but fewer or no authenticatees 170 to modify a website pointed to by the domain name. This customization has the advantage of allowing different levels of protection for different protected activities, even for the same domain name.

With reference to FIGS. 2-5, another method of protecting a domain name registered to a user 100 from an unauthorized first protected activity will be discussed. The domain name registrar 130 may transmit an interface 200 to a client device 110. The interface 200 preferably displays all of the domain names registered to a user 100 by the domain name registrar 130. The interface 200 may be configured to enable the user 100 to select one or more domain names registered to the user 100. As a non-limiting example, FIG. 2 illustrates a possible interface 200 for displaying and allowing the user 100 to select one or more domain names registered to the user 100. The domain name registrar 130 may have read the registered domain names from the account 150 of the user 100.

The domain name registrar 130 may transmit the interface 200 to the client device 110. The interface 200 may display a plurality of protected activities, wherein the interface 200 is configured to enable the user 100 to select one or more protected activities. As non-limiting examples, the protected activities may be 1) removing the domain name from an account 150 of the user 100, 2) changing a domain name system (DNS) record for the domain name(s), 3) editing a website pointed to by one of the domain name(s) and/or 4) changing access to an email account based on one or more of the domain name(s). A non-limiting example of an interface 200 is illustrated in FIG. 3.

The domain name registrar 130 may transmit the interface 200 to the client device 110 displaying one or more known authenticatees 170 and/or enabling the user 100 to enter one or more new authenticatees 170. The interface 200 may be configured to enable the user 100 to select a plurality of selected authenticatees 170. These are the authenticatees 170 that will be attempted to be authenticated by at least two different authentication methods during the approval process of any of the one or more selected protected activities for the one or more selected domain names.

The domain name registrar 130 may also transmit the interface 200 to the client device 110 configured to enable the user 100 to enter a contact method for each of the plurality of selected authenticatees 170.

The domain name registrar 130 may also transmit the interface 200 to the client device 110 of the user 100 configured to receive a minimum number of the plurality of selected authenticatees 170 in the plurality of authenticatees 170 that must be authenticated for a successful multifactor authentication. A non-limiting example is illustrated in FIG. 4.

The domain name registrar 130 may also transmit the interface 200 configured to receive at least two authentication methods for each selected authenticatee 170. The at least two authentication methods correspond to two different members selected from the group consisting of 1) what you know based authentication, 2) what you are based authentication and 3) what you have based authentication. The interface 200 is preferably configured to receive two correct responses corresponding to the two authentication methods. A non-limiting example is illustrated in FIG. 5. The data or information received via the interface 200 as illustrated in FIGS. 2-5 may be stored in a database 160 and in any desired format, such as the database 160 and format illustrated in FIGS. 6-9. It should be noted that the interfaces 200 illustrated in FIGS. 2-5 are non-limiting examples. In addition, the interfaces 200 illustrated in FIGS. 2-5 may be combined and/or separated as desired in different embodiments.

The domain name registrar 130 may lock or prevent the one or more protected activities from being performed on the one or more selected domain names until a successful multifactor authentication, as chosen and defined by the user 100 and/or authenticatees 170, has been completed. The domain name registrar 130 may monitor requests from the user 100 (or possibly someone posing as the user) to determine if the request is a protected activity on a selected domain name. If a user 100 make a request for a protected activity on a protected domain name, the domain name registrar 130 may perform an authentication attempt as defined by the user 100 and/or authenticatees 170 as described above.

Upon receiving two correct responses from at least the minimum number of authenticatees 170 in the plurality of authenticatees 170 that must be authenticated for a successful multifactor authentication, the domain name registrar 130 may perform the one or more protected activities on the selected one or more domain names.

Figure 11:
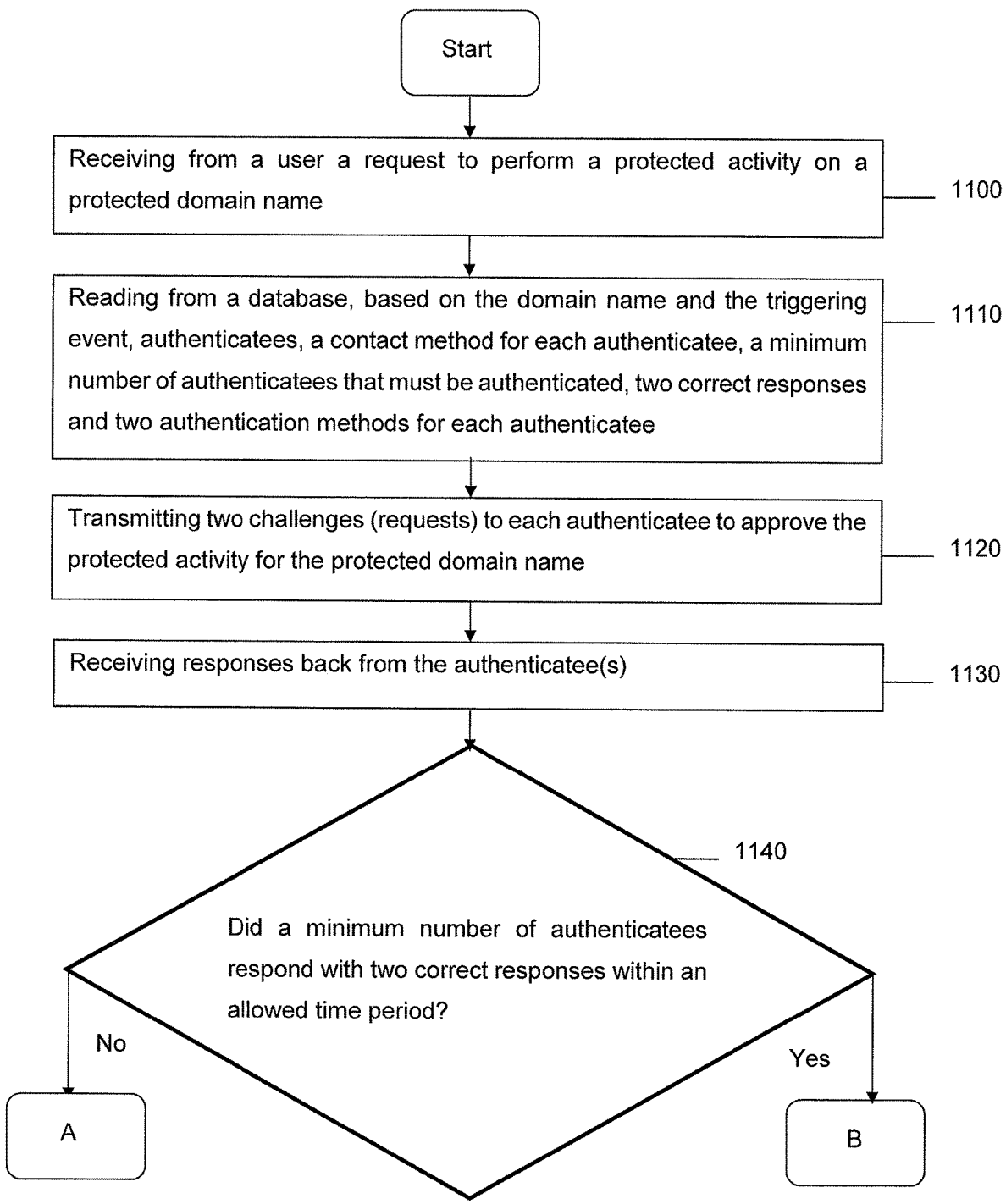
FIGS. 11-13 are flowcharts illustrating possible embodiments of methods for requesting and authenticating a minimum number of authenticatees for performing protected activities on selected domain names.
Figure 12:
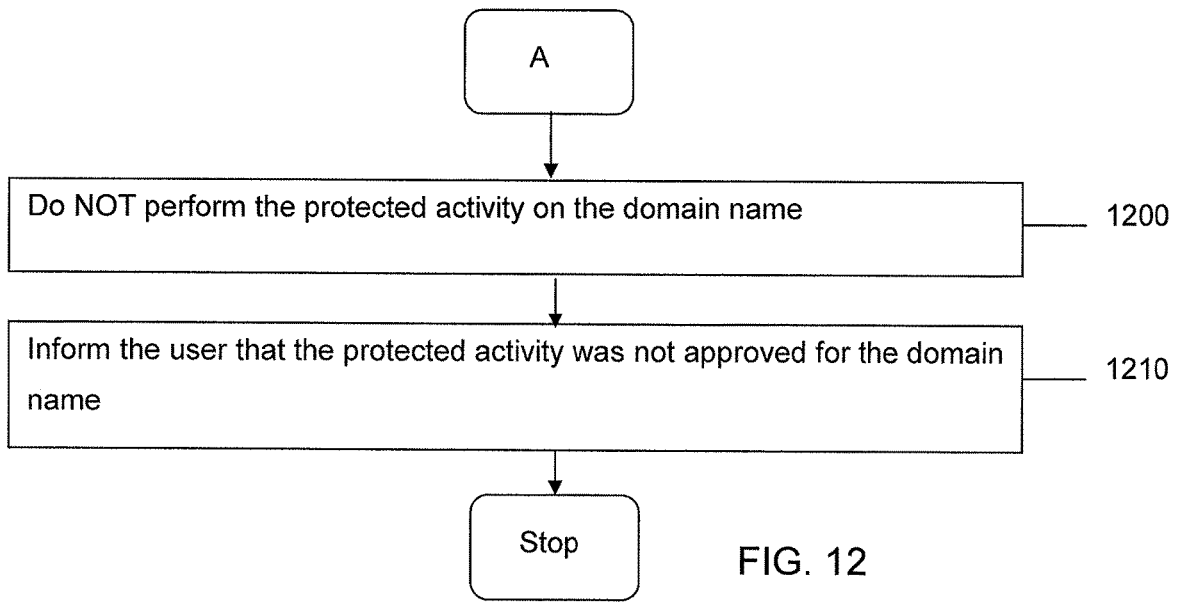
Figure 13:
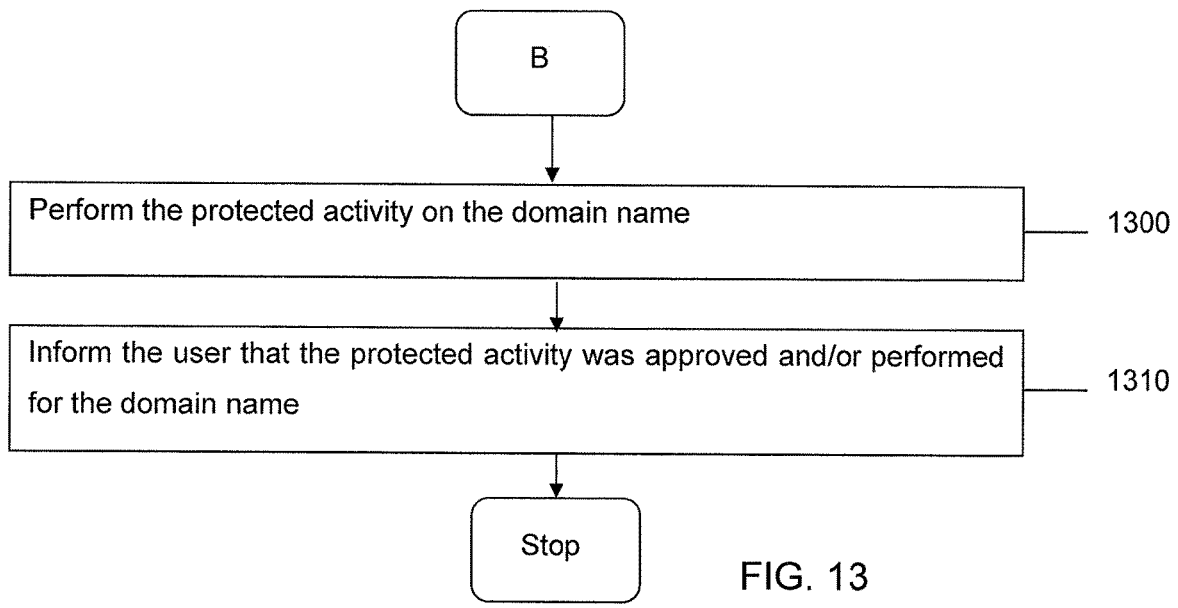

Referring to FIGS. 11-13, a method of performing a successful multifactor authentication to enable a performance of a protected activity for a domain name registered to a user 100 will now be described. The domain name registrar 130 may receive over a computer network a command or a request from the user 100 for a protected activity for a protected domain name. (Step 1100) The protected activity may be, as non-limiting examples, 1) removing the first domain name from a current account 150, 2) changing a domain name system record for the first domain name, 3) editing a website pointed to by the first domain name and/or 4) changing access to an email account based on the first domain name.

The domain name registrar 130 may read from the database 160 for the user 100, the domain name and the protected activity, 1) a plurality of authenticatees 170, 2) a contact method for each authenticatee 170, 3) a first minimum number of authenticatees 170 that must be authenticated for a successful multifactor authentication, 4) two correct responses and 5) two authentication methods for each authenticatee 170 in the plurality of authenticatees 170. (Step 1110)

In preferred embodiments, the two authentication methods correspond to two different members selected from the group consisting of 1) what you know based authentication, 2) what you are based authentication and 3) what you have based authentication. As examples, the two authentication methods may be "what you know" AND "what you have" as they are different authentication methods, but should not both be in the same type, such as a fingerprint and an iris scan, as these are both in the same type of authentication method of "what you are."

The domain name registrar 130 may transmit an authentication request for each of the two different authentication methods to each of the authenticatees 170 in the plurality of authenticatees using the corresponding contact method for each authenticatee 170. (Step 1120) The domain name registrar 130 may or may not receive responses back from one or more of the authenticatees 170. (Step 1130)

The domain name registrar 130 may compare the responses from the authenticatees 170 with the correct responses stored in the database 160 and determine whether a minimum number of authenticatees 170 responded back with at least two correct responses (where each response is from a different group). (Step 1140)

If less than the minimum number of authenticatees 170 responded back with two correct responses, the requested protected activity is not performed on the domain name. (Step 1200) The user 100 may be informed that the protected activity will not be performed. (Step 1210)

In some embodiments, if any one of the authenticatees 170 specifically responds back to not perform the protected activity, the domain name registrar 130 may block, i.e., not perform, the requested protected activity.

In some embodiments, each authenticatee 170 (or each authentication method) may be assigned a weight (either by the user 100 or by the domain name registrar 130). The one or more protected activities are only performed on the selected one or more domain name(s) if the sum of all of the weights for each authenticatee 170 (or authentication methods) that approves and/or is successfully authenticated is greater than a predetermined threshold selected by either the user 100 or the domain name registrar 130.

In other embodiments, one or more of the authenticatees 170 may be identified as essential, and the one or more protected activities are only performed on the selected domain name(s) if all of the identified essential authenticatees 170 are authenticated and/or approve the performance of the protected activity.

If the minimum number of authenticatees 170 did respond back with at least two correct responses from different groups of 1) what you know, 2) what you are and 3) what you have, then the protected activity may be performed on the protected domain name. (Step 1300) The user 100 may be informed that the protected activity will be or has been performed. (Step 1310) In other embodiments, the user 100 may select one or more authenticatees 170 that have to respond back with at least one, two, three or more correct responses. In other embodiments, the user 100 may select that the correct responses do or do not have to come from different groups of 1) what you know, 2) what you are and 3) what you have.

Wizard for providing enhanced security for a domain name

In some embodiments, the domain name registrar 130 may determine that one or more domain names have a value and/or a rate of Internet traffic via the domain name or a website above a predetermined threshold. The domain name registrar 130 may recommend to the user 100 that the domain name(s) having the high value and/or rate of Internet traffic should receive enhanced protection through the use of multifactor authentication as described in any of the above embodiments. In preferred embodiments, the successful multifactor authentication requires the domain name registrar 130 to receive two correct responses from at least the minimum number of authenticatees 170 before performing a protected activity on a protected domain name.

Upon receiving a request from the user 100, the domain name registrar 130 may use any of the above described methods for enhancing the security of the domain name or the website pointed to by the domain name.

The value of the domain name or rate of Internet traffic may also be checked periodically (entirely without receiving a request by the user 100), and as the value and/or rate of the Internet traffic to the website increases, the domain name registrar 130 may suggest additional protection appropriate for the increased value and/or website traffic.

In some embodiments, software may be used that acts as a wizard to assist a user 100 in obtaining enhanced security, such as multi-factor authentication, for one or more domain names. The software preferably performs as many of the steps in the background as possible to simply the process for the user 100, while still allowing the user 100 to have control over the domain name and allowing the domain name registrar 130 to provide enhanced security for the domain name.

The software may be triggered upon the domain name registrar 130 receiving a request from the user 100 for enhanced security for the domain name. In other embodiments, the software may receive from the user 100 a requested level of protection for one or more domain names and/or one or more associated websites. The request for enhanced security from the user 100 may comprise an indication of a level of protection, such as, as non-limiting examples, yes or no; low, medium or high or a request on a scale, such as from one to 10.

If a requested level of protection is received from the user 100, this information may be used, as non-limiting examples, to select one or more protected activities and/or a minimum number of authenticatees 170 that must be authenticated for a successful multifactor authentication. In other words, the higher the requested level of security requested by the user 100, the more activities are protected and/or the more authenticatees 170 that are required to be authenticated, i.e., the minimum number of authenticates is higher, prior to performing a protected activity.

The domain name registrar 130 may use other methods besides receiving a requested level of protection from the user 100 to determine an appropriate level of protection for the one or more domain names. As non-limiting examples, the domain name registrar 130 may, without receiving input from the user 100, determine one or more risk factors of: 1) the value of the domain name, 2) the value of the website pointed to by the domain name, 3) the rate of Internet traffic for the domain name, 4) the type of use of the website, i.e., commercial or personal and/or 5) the risk of loss as determined by a quantity and an access of the website to financial records, health records and/or customer personal information. One or more of these risk factors may be used to recommend to the user 100 that enhanced security should be used and a level of the enhanced security for the user's domain name.

The domain name registrar 130 may calculate a value of the domain name. The higher the value of the domain name, the greater (more protected activities and/or more authenticatees 170 that must be authenticated) the appropriate level of enhanced protection for the domain name.

The domain name registrar 130 may determine a rate of Internet traffic to the website, such as a number of visitors to the website per day. The higher the rate of Internet traffic to the website, the greater (more protected activities and/or more authenticatees 170 that must be authenticated) the appropriate level of enhanced protection for the domain name.

The domain name registrar 130 may also determine whether the website pointed to by the domain name is a commercial website. Commercial websites generally deserve a greater (more protected activities and/or more authenticatees 170 that must be authenticated) level of enhanced protection than personal websites.

The domain name registrar 130 may also parse a software or computer code used to construct the website to determine if the website has access to financial records, health records or customer personal information to determine a risk of loss for the domain name. The greater the access, the number of financial records, the number of health records and/or the number or level of confidentiality of the customer personal information, the greater (more protected activities and/or more authenticatees 170 that must be authenticated) the appropriate level of enhanced security for the domain name and/or website.

The domain name registrar 130 may select one or more protected activities that will only be performed after a successful multifactor authentication for the domain name. The selected one or more protected activities may be at least partially based on the risk factors and directly related to a calculated value of the domain name, a determined rate of Internet traffic to the website, whether the website is determined to be a commercial website and/or a risk of loss for the domain name. The one or more protected activities may be selected from the group consisting of removing the domain name from the account 140 of the user 100, changing a domain name system record for the domain name, editing the website pointed to by the domain name and changing access to an email account based on the domain name.

The domain name registrar 130 may determine or receive from the user 100 for each authenticatee 170 in the plurality of authenticatees, two authentication methods. The two authentication methods correspond to two different members of the group consisting of what you know based authentication, what you are based authentication and what you have based authentication. The domain name registrar 130 may also determine or receive from the user 100 or authenticatees 170 two different correct responses corresponding to the two authentication methods.

The domain name registrar 130 may select a minimum number of authenticatees 170 that must be authenticated for a successful multifactor authentication for the domain name. The selected minimum number of authenticatees 170 may be at least partially based on the risk factors and are preferably directly related to the calculated value of the domain name, the determined rate of Internet traffic to the website, whether the website is determined to be a commercial website and/or a risk of loss for the domain name or website.

The domain name registrar 130 may select a minimum number of authenticatees 170 that must be authenticated for a successful multifactor authentication for the domain name. The minimum number of authenticatees 170 may be higher, as non-limiting examples, if the value of the domain name is higher, the rate of Internet traffic to the website is higher, the website is determined to be a commercial website and/or the website stores or has access to health records, financial records and/or customer confidential information.

The domain name registrar 130 may display an offer to provide enhanced security for the domain name and its associated website on a client device 110 to the user 100. The displayed offer may comprise the domain name(s), the one or more protected activities, the plurality of authenticatees 170 with one or more contact methods for each authenticatee and a minimum number of authenticatees 170 required to be authenticated for the successful multifactor authentication. The interface displaying the offer preferably is configured to allow the user 100 to modify, edit, add or delete one or more domain names, one or more protected activities, one or more authenticatees, one or more contact information for the authenticatees and the minimum number of authenticatees 170 required to be authenticated using two authentication methods from different groups for the successful multifactor authentication.

The domain name registrar 130 may receive changes and/or an acceptance of the offer from the user 100. The domain name registrar 130 may block one or more attempts of performing a protected activity in the one or more protected activities on the domain name prior to performing a successful multifactor authentication as stated in the original or altered offer.

It should be appreciated that the interfaces 200 in FIGS. 2-5 are exemplary only and may be presented to the user 100 in a different order, be combined into one, two, three or four different interfaces 200 and/or may be further separated as desired. It should be appreciated that while domain names where primarily used in the examples, other Internet resources may also be protected using the above described methods. It should also be appreciated that the invention may be used to protect any asset accessible online. It should also be appreciated that the user 100, i.e., the owner of the asset, may select one or more authenticatee(s) 170 and one or more required authentication methods for each authenticatee 170.

Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

The invention claimed is:

1. A method for a domain name registrar to provide enhanced security for a domain name registered to a user, wherein the domain name directs Internet traffic to a website, comprising the steps of:
  reading by the domain name registrar the domain name registered to the user from a user account provided by the domain name registrar and managed by the user;
  calculating by the domain name registrar a value of the domain name or determining a rate of Internet traffic to the web site;
  upon calculating by the domain name registrar the value of the domain name is over a first predetermined value or determining the rate of Internet traffic to the web site is over a second predetermined value, performing the steps of:
    selecting by the domain name registrar one or more protected activities that will only be performed after a successful multifactor authentication for the domain name, wherein the selected one or more protected activities are at least partially based on the calculated value of the domain name or the determined Internet traffic rate to the website;
    parsing by the domain name registrar public records to determine a plurality of authenticatees associated with the domain name or the web site and one or more contact methods for each of the plurality of authenticatees;
    determining or receiving by the domain name registrar for each authenticatee in the plurality of authenticatees two authentication methods corresponding to two different members of a group consisting of what you know based authentication, what you are based authentication and what you have based authentication and two different correct responses corresponding to the two authentication methods;
    selecting by the domain name registrar a minimum number of authenticatees that must be authenticated for a successful multifactor authentication for the domain name, wherein the minimum number of authenticatees is directly related to the calculated value of the domain name or the determined Internet traffic rate to the web site;
    displaying by the domain name registrar an offer to provide enhanced security for the domain name on a client device to the user;
    receiving by the domain name registrar an acceptance of the offer from the user; and
    blocking one or more attempts of performing a protected activity in the one or more protected activities on the domain name prior to performing a successful multifactor authentication.

2. The method of claim 1, wherein the one or more protected activities are selected from a group consisting of removing the domain name from the account of the user, changing a domain name system record for the domain name, editing the website pointed to by the domain name and changing access to an email account based on the domain name.

3. The method of claim 1, wherein the displayed offer comprises the domain name, the one or more protected activities, the plurality of authenticatees with one or more contact methods for each authenticatee and a minimum number of authenticatees required to be authenticated for the successful multifactor authentication.

4. The method of claim 1, wherein the successful multifactor authentication requires the domain name registrar to receive two correct responses from at least the minimum number of authenticatees.

5. The method of claim 1, wherein the parsing by the domain name registrar public records to determine the plurality of authenticatees associated with the domain name or the website and one or more contact methods for each of the plurality of authenticatees, further comprises the steps of parsing a WHOIS database for the domain name for contact information to determine one or more authenticatees in the plurality of authenticatees.

6. The method of claim 1, wherein the parsing by the domain name registrar public records to determine the plurality of authenticatees associated with the domain name or the website and one or more contact methods for each of the plurality of authenticatees, further comprises the steps of parsing the website for website identified Vice Presidents, President and/or Board of Directors to determine one or more authenticatees in the plurality of authenticatees.

7. The method of claim 1, wherein the parsing by the domain name registrar public records to determine the plurality of authenticatees associated with the domain name or the website and one or more contact methods for each of the plurality of authenticatees, further comprises the steps of:
  parsing by the domain name registrar the website for a corporation identified by the website as operating the web site; and
  parsing by the domain name registrar corporate filings of the corporation to determine one or more authenticatees in the plurality of authenticatees.

8. A method for a domain name registrar to provide enhanced security for a domain name registered to a user, wherein the domain name directs Internet traffic to a website, comprising the steps of:
  reading by the domain name registrar the domain name registered to the user from a user account provided by the domain name registrar and managed by the user;
  determining by the domain name registrar whether the website is a commercial website; upon determining by the domain name registrar that the website is a commercial website, performing the steps of:
    selecting by the domain name registrar one or more protected activities that will only be performed after a successful multifactor authentication for the domain name, wherein the selected one or more protected activities are at least partially based on whether the website is determined to be a commercial website;
    parsing by the domain name registrar public records to determine a plurality of authenticatees associated with the domain name or the web site and one or more contact methods for each of the plurality of authenticatees;
    determining or receiving by the domain name registrar for each authenticatee in the plurality of authenticatees two authentication methods corresponding to two different members of a group consisting of what you know based authentication, what you are based authentication and what you have based authentication and two different correct responses corresponding to the two authentication methods;
    selecting by the domain name registrar a minimum number of authenticatees that must be authenticated for a successful multifactor authentication for the domain name, wherein the minimum number of authenticatees is higher if the web site is determined to be a commercial website;

displaying by the domain name registrar an offer to provide enhanced security for the domain name on a client device to the user;

receiving by the domain name registrar an acceptance of the offer from the user; and blocking one or more attempts of performing a protected activity in the one or more protected activities on the domain name prior to performing a successful multifactor authentication.

9. The method of claim 8, wherein the one or more protected activities are selected from a group consisting of removing the domain name from the account of the user, changing a domain name system record for the domain name, editing the website pointed to by the domain name and changing access to an email account based on the domain name.

10. The method of claim 8, wherein the displayed offer comprises the domain name, the one or more protected activities, the plurality of authenticatees with one or more contact methods for each authenticatee and a minimum number of authenticatees required to be authenticated for the successful multifactor authentication.

11. The method of claim 8, wherein the successful multifactor authentication requires the domain name registrar to receive two correct responses from at least the minimum number of authenticatees.

12. The method of claim 8, wherein the parsing by the domain name registrar public records to determine the plurality of authenticatees associated with the domain name or the web site and one or more contact methods for each of the plurality of authenticatees, further comprises the steps of parsing a WHOIS database for the domain name for contact information to determine one or more authenticatees in the plurality of authenticatees.

13. The method of claim 8, wherein the parsing by the domain name registrar public records to determine the plurality of authenticatees associated with the domain name or the web site and one or more contact methods for each of the plurality of authenticatees, further comprises the steps of parsing the website for website identified Vice Presidents, President and/or Board of Directors to determine one or more authenticatees in the plurality of authenticatees.

14. The method of claim 8, wherein the parsing by the domain name registrar public records to determine the plurality of authenticatees associated with the domain name or the web site and one or more contact methods for each of the plurality of authenticatees, further comprises the steps of:

parsing by the domain name registrar the website for a corporation identified by the website as operating the web site; and parsing by the domain name registrar corporate filings of the corporation to determine one or more authenticatees in the plurality of authenticatees.

15. A method for a domain name registrar to provide enhanced security for a domain name registered to a user, wherein the domain name directs Internet traffic to a website, comprising the steps of:

reading by the domain name registrar the domain name registered to the user from a user account provided by the domain name registrar and managed by the user;

parsing by the domain name registrar a computer code used to construct the web site to determine if the website has access to financial records, health records or customer personal information to determine a risk of loss for the domain name;

upon determining the website has access to financial records, health records or customer personal information, performing the steps of:

selecting by the domain name registrar one or more protected activities that will only be performed after a successful multifactor authentication for the domain name, wherein the selected one or more protected activities are at least partially based on the determined risk of loss for the domain name;

parsing by the domain name registrar public records to determine a plurality of authenticatees associated with the domain name or the web site and one or more contact methods for each of the plurality of authenticatees;

determining or receiving by the domain name registrar for each authenticatee in the plurality of authenticatees two authentication methods corresponding to two different members of a group consisting of what you know based authentication, what you are based authentication and what you have based authentication and two different correct responses corresponding to the two authentication methods;

selecting by the domain name registrar a minimum number of authenticatees that must be authenticated for a successful multifactor authentication for the domain name, wherein the minimum number of authenticatees is directly related to the determined risk of loss for the domain name;

displaying by the domain name registrar an offer to provide enhanced security for the domain name on a client device to the user;

receiving by the domain name registrar an acceptance of the offer from the user; and blocking one or more attempts of performing a protected activity in the one or more protected activities on the domain name prior to performing a successful multifactor authentication.

16. The method of claim 15, wherein the one or more protected activities are selected from a group consisting of removing the domain name from the account of the user, changing a domain name system record for the domain name, editing the web site pointed to by the domain name and changing access to an email account based on the domain name.

17. The method of claim 15, wherein the displayed offer comprises the domain name, the one or more protected activities, the plurality of authenticatees with one or more contact methods for each authenticatee and a minimum number of authenticatees required to be authenticated for the successful multifactor authentication.

18. The method of claim 15, wherein the successful multifactor authentication requires the domain name registrar to receive two correct responses from at least the minimum number of authenticatees.

19. The method of claim 15, wherein the parsing by the domain name registrar public records to determine the plurality of authenticatees associated with the domain name or the web site and one or more contact methods for each of the plurality of authenticatees, further comprises the steps of parsing a WHOIS database for the domain name for contact information to determine one or more authenticatees in the plurality of authenticatees.

20. The method of claim 15, wherein the parsing by the domain name registrar public records to determine the plurality of authenticatees associated with the domain name or the web site and one or more contact methods for each of the plurality of authenticatees, further comprises the steps of parsing the website for website identified Vice Presidents, President and/or Board of Directors to determine one or more authenticatees in the plurality of authenticatees.

\* \* \* \* \*